United States Patent [19]
Dang

[11] Patent Number: 6,012,076
[45] Date of Patent: Jan. 4, 2000

[54] ARITHMETIC LOGIC UNIT HAVING PRESHIFT AND PREROUND CIRCUITS

[75] Inventor: Keith Duy Dang, Pflugerville, Tex.

[73] Assignee: Motorola, Inc., Schaumburg, Ill.

[21] Appl. No.: 08/998,562

[22] Filed: Dec. 29, 1997

[51] Int. Cl.[7] .................................................. G06F 7/38
[52] U.S. Cl. ............................................ 708/490; 708/551
[58] Field of Search .................................. 708/497, 498, 708/505, 551, 552, 670, 490

[56] References Cited

U.S. PATENT DOCUMENTS 4,922,446  5/1990  Zurawski et al. ........................ 708/505
5,390,134  2/1995  Heikes et al. ............................ 364/745
5,677,861  10/1997  Inoue et al. ............................. 708/505

*Primary Examiner*—Tan V. Mai
*Attorney, Agent, or Firm*—Bruce E. Hayden; Jeffrey G. Toler

[57] ABSTRACT

An arithmetic logic unit (30) for a digital signal processor (DSP) contains circuitry for preshifting (46, 48) and prerounding (54) the 2's-complement fractional input operands (32, 34) before they are used by a carry look-ahead adder (56). The preshifting (46, 48) provides for efficient divide-by-2 and divide-by-4 functionality and reduces early overflow. Concurrent preshifting (46, 48) and prerounding (54) improve the critical path timing in the carry look-ahead adder (56).

16 Claims, 2 Drawing Sheets

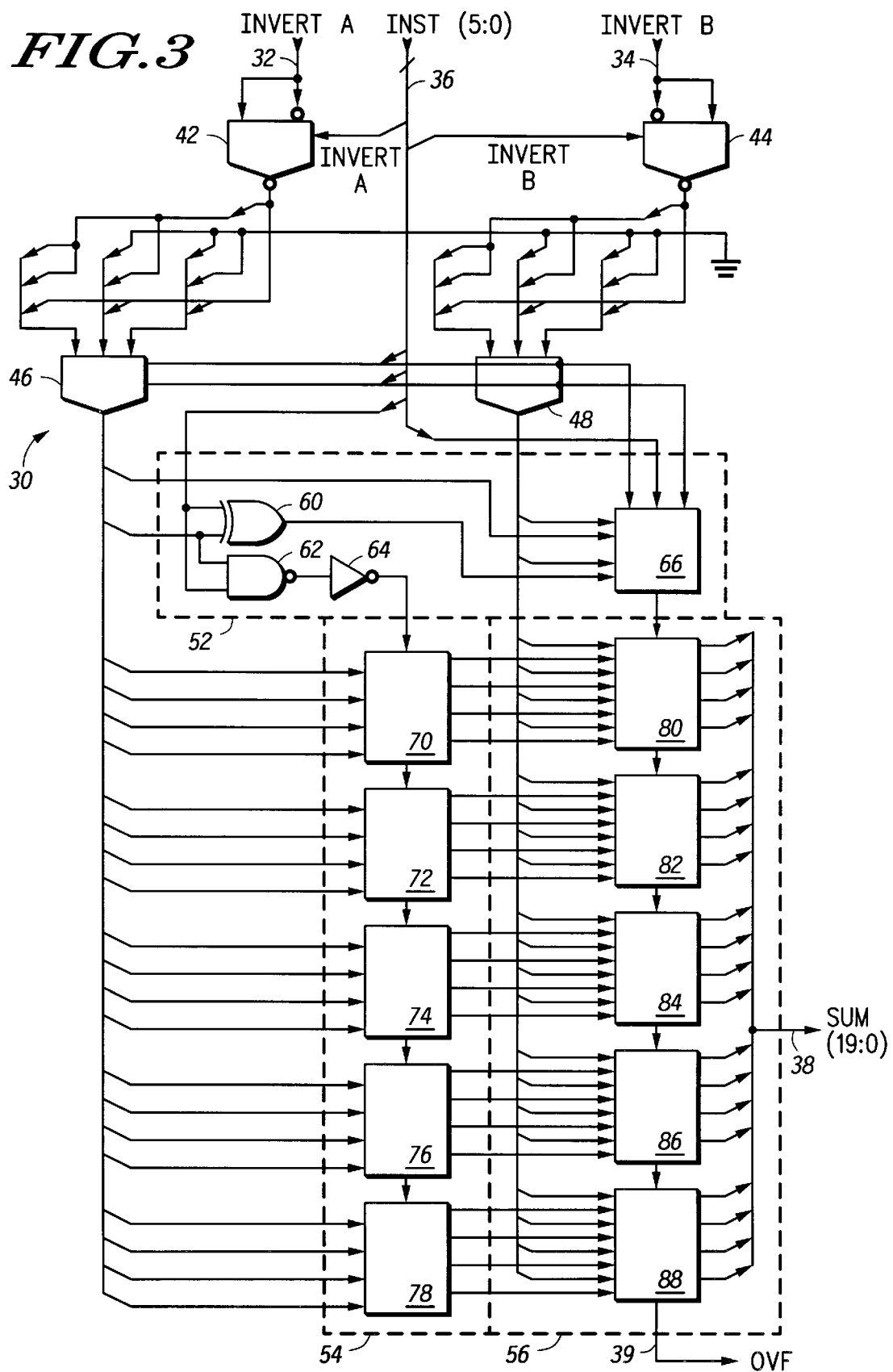

ARITHMETIC LOGIC UNIT HAVING PRESHIFT AND PREROUND CIRCUITS

FIELD OF THE INVENTION

The present invention generally relates to arithmetic logic units, and more specifically to arithmetic logic units utilized in digital signal processors (DSP) to perform Fast Fourier Transforms.

BACKGROUND OF THE INVENTION

Digital signal processors (DSP) often implement Fast Fourier Transforms. The Fast Fourier Transforms (FFT) have a need to calculate sums and differences and the result is scaled down by using a divider circuit which divides by 2 or 4. This division can often be optimized by utilization of shift operations. A divide by 2 is a right shift of one-bit, and a divide by 4 is a right shift by 2-bits.

Since Fast Fourier Transforms are heavily used in some DSP applications, it would be advantageous to be able to optimize the divide by 2 or 4 of sums and differences.

One solution to this problem is to use two sets of adders along with a rounding logic network to perform addition and round-off. This method has a disadvantage that it uses additional adder cells over a standard arithmetic logic unit (ALU). These additional adder cells are used to hold the lower significant bits before a final round-off addition.

In another high-speed floating point design, the two sum or difference operands are added, and the result is then rounded before sending the intermediate output value to a shifter for normalizing a final result. One problem with this approach is that the adder array must have equal numbers of bit cells for each bit and must prevent the circuit from early overflow. This requires more gates to implement and also slows down the carry chain timing.

BRIEF DESCRIPTION OF THE DRAWINGS

The features and advantages of the present invention will be more clearly understood from the following detailed description taken in conjunction with the accompanying FIGURES where like numerals refer to like and corresponding parts and in which:

FIG. 3 is a schematic level diagram of the arithmetic logic unit 30 shown in FIG. 1.

DETAILED DESCRIPTION

An arithmetic logic unit (ALU) having a shifter for dividing by 2 or 4, is used to implement high-speed arithmetic logic. The rounding logic rounds both concurrently and prior to performing a final addition or subtraction. This can significantly speed up the critical path delay of the ALU, minimizing the number of adder cells needed to perform rounding, and preventing the possibility of early overflow.

Figure 1:
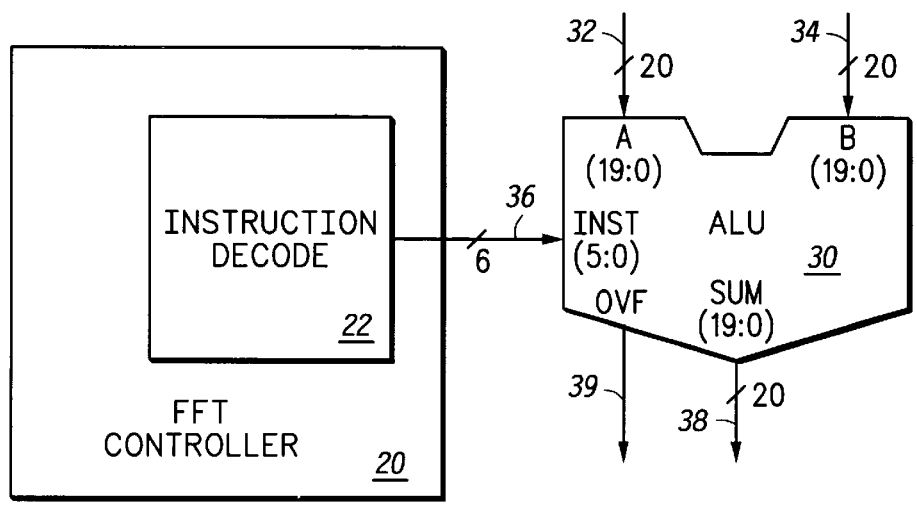
FIG. 1 is a partial block diagram illustrating operation of an arithmetic logic unit (ALU) operating in conjunction with a Fast Fourier Transform (FFT) controller, in accordance with the present invention.

FIG. 1 is a partial block diagram illustration operation of an arithmetic logic unit (ALU) operating in conjunction with a Fast Fourier Transform (FFT) controller 20. The FFT controller 20 contains instruction decode circuitry 22. The lower 6 bits of the instruction decoded 36 operate as control inputs to the ALU 30. There are two data operands to the ALU 30: A 32, and B 34. Both the A 32 and B 34 operands are initially 20 bits wide. ALU 30 generates a 20-bit sum 38 and a 1-bit overflow 39.

Figure 2:
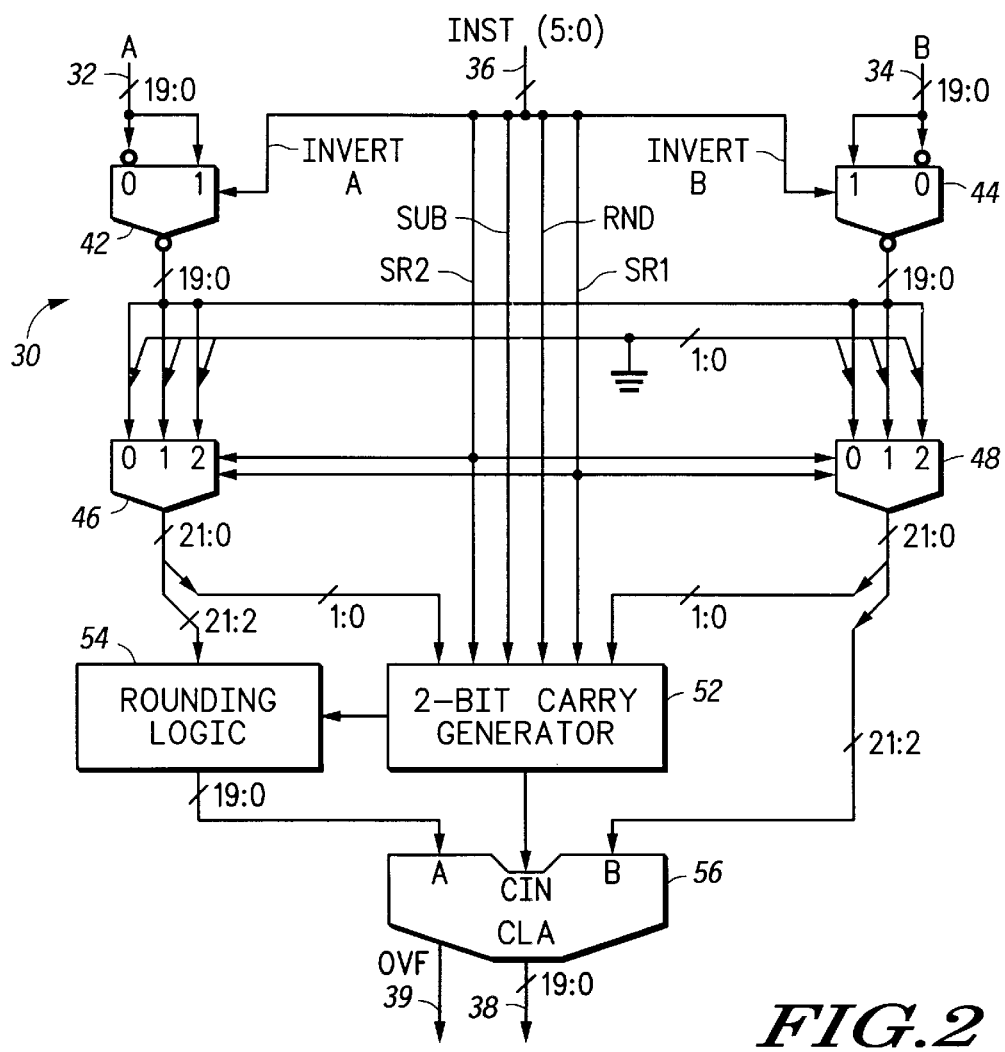
FIG. 2 is a block diagram illustrating ALU 30 shown in FIG. 1.

FIG. 2 is a block diagram illustrating ALU 30 shown in FIG. 1. The 6-bit instruction input 36 is exploded into 6 input signals titled INVERT A, INVERT B, shift right by one position (SR1), shift right by two positions (SR2), subtract (SUB), and round (RND). Input into a first 2-to-1 MUX 42 is the A input operand 32 and its inverse. This 2-to-1 MUX 42 is controlled by the INVERT A signal. Likewise, a second 2-to-1 MUX 44 has two inputs: the B input operand 34, and its inverse. This second 2-to-1 MUX 44 is controlled by the INVERT B signal. The INVERT A and INVERT B signals thus provide a capability of adding or subtracting the A 32 and B 34 operands to or from each other in any combination. Note that 2-to-1 MUXes 42 and 44 are shown in FIG. 2 as doubly inverting the input for a control signal equal to zero (0), and singly inverting for a control signal equal to one (1). It is understood that the circuit may be implemented without doubly inverting the "zero" input. Both the first (A) 32 and second (B) 34 operands are twenty-bit 2's-complement binary fractional numbers.

The output of the first 2-to-1 MUX 42 forms the three inputs to the 3-to-1 MUX 46, in combination with ground. In the instance where the control signals have a value of zero (0), the 20 bits from the first 2-to-1 MUX 42 form the high order 20 bits of the first input to the 3-to-1 MUX 46, with a value of ground or zero for the low order two bits. For the second input to the 3-to-1 MUX 46, selected by a one (1) input, the low order bit is zero, the next higher order twenty (20) bits are taken from the output of the first 2-to-1 MUX 42, and the high order bit is sign-copied from the high order bit from the first 2-to-1 MUX 42. Likewise, for the third input, selected by a control value of binary two (2), the low order 20 bits of the third input are the twenty (20) bits output from the first 2-to-1 MUX 42, and the high order two bits are sign-copied from the high order output bit of the first 2-to-1 MUX 42. Thus, the 2-bit input to the 3-to-1 MUX 46 forms a binary 2-bit integer which represents the number of bits to shift the input operand 32. Similarly, a second 3-to-1 MUX 48 has as its three inputs the output of the second 2-to-1 MUX 44 right shifted by 0, 1, or 2 bits, with the low order bits being replaced with binary zero (0), the high order bits replaced by the high order output bit from the second 2-to-1 MUX 44, as indicated in the first 3-to-1 MUX 46. The 2-bit shift for both the first 3-to-1 MUX 46 and the second 3-to-1 MUX 48 are specified by the a binary integer formed from the SR1 and SR2 signals.

A 2-bit carry generator 52 has as its inputs the low order 2-bits of the first 3-to-1 MUX 46 and the second 3-to-1 MUX 48, the SR1, SR2, SUB, and RND signals. The 2-bit carry generator 52 generates a 1-bit carry-in for a rounding logic circuit 54 and a 1-bit carry-in for a carry look-ahead adder 56. The rounding logic circuit 54 rounds the first (A) operand 32 based on the value of the high order 20 of 22-bits from the output of the first 3-to-1 MUX 46, and the carry-in from the 2-bit carry generator 52. The rounding logic circuit 54 generates one 20-bit input operand to a carry look-ahead adder (CLA) 56. The second 20-bit operand to the carry look-ahead adder (CLA) 56 are the high order 20-bits from the second 3-to-1 MUX 48. As noted above, a carry-in to the carry look-ahead adder (CLA) 56 is provided by the 2-bit carry generator 52. The carry look-ahead adder generates a 20-bit sum 38 and a 1-bit overflow 39.

Input operands (A) 32 and (B) 34 are inserted into two 2-to-1 inverted input MUXes 42, 44. If the instruction requested is a subtract operation, the corresponding input will be inverted before being transferred to the corresponding 3-to-1 input MUX 46, 48. In this context, only a divide-by-2 and divide-by-4 are needed, and hence the two 3-to-1 MUXes 46, 48 are sufficient for these division values. Thus, the values shifted right are shifted either by 0, 1, or 2 bits depending on the predetermined divide-by value. The path in the first input operand (A) 32 is then passed through the rounding logic circuit 54 and is controlled by the round (RND) signal and the carry-bit from the carry generator 52. The carry generator circuit 52 is designed to detect a carry from the two least significant bits whenever rounding is requested, and signals to the rounding logic circuit 54 as well as the carry look-ahead adder 56 to perform round-off functions. The rounding result will then be added to the recoded version of the second input operand (B) 34 and the final sum is generated 38. One advantage of this system is that while the adder is working to generate and propagate a carry in the lower portion of the significant bits, the rounding logic 54 can head-start on the rounding and have an intermediate result ready by the time the upper portion of the significant bits in the carry look-ahead adder (CLA) 56 are being generated. This provides enhanced speed in the CLA and minimizes the possible number of adder cells required for the ALU 30.

Table T-1 illustrates the low order instruction bit signal values 36 received from the instruction decoder 22 that generate fifteen different combinations of adding, subtracting, and dividing the two input operands.

TABLE T-1

| SIGNAL NAME/<br>OPERATION | INVA | INVB | SUB | SR1 | SR2 | RND |
|---|---|---|---|---|---|---|
| A+B | 0 | 0 | 0 | 0 | 0 | 0 |
| A−B | 0 | 1 | 1 | 0 | 0 | 0 |
| B−A | 1 | 0 | 1 | 0 | 0 | 0 |
| (A+B)/2 | 0 | 0 | 0 | 1 | 0 | 0 |
| (A−B)/2 | 0 | 1 | 1 | 1 | 0 | 0 |
| (B−A)/2 | 1 | 0 | 1 | 1 | 0 | 0 |
| (A+B)/2+RND | 0 | 0 | 0 | 1 | 0 | 1 |
| (A−B)/2+RND | 0 | 1 | 1 | 1 | 0 | 1 |
| (B−A)/2+RND | 1 | 0 | 1 | 1 | 0 | 1 |
| (A+B)/4 | 0 | 0 | 0 | 0 | 1 | 0 |
| (A−B)/4 | 0 | 1 | 1 | 0 | 1 | 0 |
| (B−A)/4 | 1 | 0 | 1 | 0 | 1 | 0 |
| (A+B)/4+RND | 0 | 0 | 0 | 0 | 1 | 1 |
| (A−B)/4+RND | 0 | 1 | 1 | 0 | 1 | 1 |
| (B−A)/4+RND | 1 | 0 | 1 | 0 | 1 | 1 |

FIG. 3 is a schematic level diagram of the arithmetic logic unit 30 shown in FIG. 1. 2-to-1 MUX 42 receives the first operand input (A) 32 and its inverse as its two inputs. The second 2-to-1 MUX 44 receives as its two inputs the second operand 34 and its inverse. The first 2-to-1 MUX 42 is controlled by the INVERT A signal and the second 2-to-1 MUX 44 is controlled by the INVERT B signal. The first 3-to-1 MUX 46 has the output of the first 2-to-1 MUX 42 and ground as its three inputs and generates a twenty-two bit intermediate output. The twenty output bits of the first 2-to-1 MUX 42 are used as the high order bits for the first (0) input to the first 3-to-1 MUX 46. The low order two bits are zero-filled. The second (1) input to the 3-to-1 MUX 46 is formed by ground as the low order bit, the twenty output bits from the first 2-to-1 MUX 42 as the middle bits, and the high order bit is sign-copied as the high order bit. Similarly, for the third (2) input to the 3-to-1 MUX 46 has the twenty output bits of the first 2-to-1 MUX 42 as the low order bits, and the high order output bit of the first 2-to-1 MUX 42 sign-copied as the high order two bits. Likewise, the second 3-to-1 MUX 48 has its inputs the various combinations of the output from the second 2-to-1 MUX 44 and ground. The first 3-to-1 MUX 46 and the second 3-to-1 MUX 48 are controlled by the SR1 and SR2 signals which together form a 2-bit integer which indicates the number of bits to shift the input operands.

The 2-bit carry generator 52 has or contains an XOR gate 60 which has as its first input the round (RND) signal, and as its second input the second low order bit from the first 3-to-1 MUX 46. This second low order-bit is also a one input to a NAND gate 62. The second input to NAND gate 62 is the RND signal. The NAND gate output 62 is inverted 64 to generate the carry-in signal to the rounding logic circuit 54. The 2-bit carry generator 52 also contains a 2-bit carry look-ahead adder 66. The 2-bit carry generator 52 has as its numeric inputs the lower two order bits from the second 3-to-1 MUX 48, the low order bit from the first 3-to-1 MUX 46, and the output from the XOR gate 60. It also has as inputs the SR1, SR2, and SUB signals. The 2-bit carry generator 52 generates the carry-in signal to the carry look-ahead adder 56. The carry look-ahead adder 56 contains five 4-bit carry look-ahead adders 80, 82, 84, 86, 88 connected together with the carry-out of one adder being connected as the carry-in of the next higher order adder. They generate a 20-bit sum 38. One set of inputs to the five 4-bit carry look-ahead adders 80, 82, 84, 86, 88 are the 20-bit output from the second 3-to-1 MUX 48. The other input set to the carry look-ahead adder 56 are the output from the rounding logic circuit 54. The carry-in input to the CLA 56 is generated by the 2-bit carry look-ahead adder 66. The high order 4-bit carry look-ahead adder 88 generates an overflow signal 39 instead of the carry out signal generated by the low order 4-bit carry look-ahead adders 80, 82, 84, 86. The rounding logic circuit 54 consists of five 4-bit rounding sub-circuits 70, 72, 74, 76, 78 connected together where a carry-out for a rounding sub-circuit is the carry-in for the next higher order rounding sub-circuit. The inputs to the five 4-bit rounding sub-circuits 70, 72, 74, 76, 78 are the 20 most significant bits of the 22 bits output from the first 3-to-1 MUX 46. The outputs from each of the five 4-bit rounding sub-circuits 70, 72, 74, 76, 78 are one of two inputs to each of the five 4-bit carry look-ahead adders 80, 82, 84, 86, 88.

The arithmetic logic unit 30 optionally pre-shifts both input operands to their appropriate divided values so that an early overflow never occurs. The shifted output of one of the operands is then rounded according to the shifted value controlled by the 2-bit carry generator 52. Then the rounded result is added to the recoded version of the second operand to form the final output 38.

This eliminates overflow in situations where the intermediate results would overflow but not the final output 38. This is because the division or shifting and rounding is done before the addition. Another advantage of this implementation is that while the adder is trying to generate and propagate the carry and the lower portion of the significant bits, the rounding logic 54 can head-start on the rounding and have the intermediate result ready by the time the upper portion of the significant bits in the CLA adder is being generated. Therefore, the speed in the CLA is enhanced and the possible number of adder cells needed is minimized.

Those skilled in the art will recognize that modifications and variations can be made without departing from the spirit of the invention. Therefore, it is intended that this invention encompass all such variations and modifications as fall within the scope of the appended claims.

Claim elements and steps herein have been numbered and/or lettered solely as an aid in readability and understanding. As such, the numbering and/or lettering in itself is not intended to and should not be taken to indicate the ordering of elements and/or steps in the claims.

What is claimed is:

1. An arithmetic logical unit (ALU) that receives a first input operand and a second input operand and generates an output result, and which comprises:

a first preshift circuit that selectively preshifts the first input operand a first shift count number of bits and generates a first intermediate operand;

a second preshift circuit that selectively preshifts the second input operand a second shift count number of bits and generates a second intermediate operand;

a carry generator that receives a low order subset of the first intermediate operand and a low order subset of the second intermediate operand and generates a carry-in signal; and an adder with two input operands which receives the first intermediate operand and the second intermediate operand as the two input operands and receives the carry-in signal and generates an output result.

2. The ALU in claim 1 which further comprises:

a preround circuit which receives the first intermediate operand and generates a one of the two input operands to the adder.

3. The ALU in claim 2 wherein:

the adder is a carry look-ahead adder.

4. The ALU in claim 3 wherein:

the adder is comprised of a plurality of 4-bit carry look-ahead adder circuits connected together with each having a carry-out and the carry-out of a lower order 4-bit carry look-ahead adder circuits generating a carry-in signal for a corresponding next higher order 4-bit carry look-ahead adder circuit.

5. The ALU in claim 1 wherein:

the first preshift circuit comprises a multiplexer (MUX) that selectively selects one of a plurality of inputs based on a selection signal, a first one of the plurality of inputs is the first input operand, and a second one of the plurality of inputs is a set of high order bits of the first input operand offset by one bit combined with a binary zero (0) as a most significant bit.

6. The ALU in claim 5 wherein:

a third one of the plurality of inputs is a set of high order bits of the first input operand offset by two bits combined with a binary zero (0) as a most significant bit.

7. The ALU in claim 1 which further comprises:

a first operand inverter which selectively inverts the first input operand, and a second operand inverter which selectively inverts the second input operand.

8. The ALU in claim 1 wherein:

the carry generator is responsive to a shift right one bit signal and a shift right two bit signal.

9. The ALU in claim 8 wherein:

the carry generator is responsive to a subtract signal and a round signal.

10. The ALU in claim 1 wherein:

a use of the first preshift circuit and the second preshift circuit eliminates at least some early overflow.

11. An arithmetic logical unit (ALU) that receives a first input operand and a second input operand and generates an output result, and which comprises:

a first operand inverter which selectively inverts the first input operand to generate a first inverted operand, and a second operand inverter which selectively inverts the second input operand to generate a second inverted operand, a first preshift circuit that selectively preshifts the first inverted operand a first shift count number of bits and generates a first intermediate operand, wherein:

the first preshift circuit comprises a first multiplexer (MUX) that selectively selects one of a plurality of inputs based on a two-bit selection signal, a second preshift circuit that selectively preshifts the second inverted operand a second shift count number of bits and generates a second intermediate operand, wherein:

the second preshift circuit comprises a second multiplexer (MUX) that selectively selects one of a plurality of inputs based on the two-bit selection signal;

a carry generator that receives a low order subset of the first intermediate operand and a low order subset of the second intermediate operand and generates a carry-in signal;

a preround circuit which receives the first intermediate operand and generates a third intermediate operand; and an adder with two input operands which receives the third intermediate operand and the second intermediate operand as the two input operands and receives the carry-in signal and generates an output result, wherein:

the adder is a carry look-ahead adder, and the adder is comprised of a plurality of 4-bit carry look-ahead adder circuits connected together with each having a carry-out and the carry-out of a lower order 4-bit carry look-ahead adder circuits generating a carry-in signal for a corresponding next higher order 4-bit carry look-ahead adder circuit.

12. An arithmetic logic unit comprising:

a first shifter to receive a first operand;

a second shifter to receive a second operand;

a carry generator responsive to the first and the second shifter;

rounding logic responsive to the first shifter and to the carry generator; and an adder responsive to the rounding logic and to the second shifter.

13. The arithmetic logic unit of claim 12, wherein the carry generator receives a portion of the data stored in the first shifter.

14. The arithmetic logic unit of claim 13, wherein the carry generator receives a portion of the data stored in the second shifter.

15. The arithmetic logic unit of claim 12, wherein the rounding logic performs a data rounding operation on data from the first shifter based on a carry signal from the carry generator.

16. The arithmetic logic unit of claim 12, wherein the adder is a carry look-ahead adder.

* * * * *